United States Patent
Barber (10) Patent No.: US 12,416,279 B1
(45) Date of Patent: Sep. 16, 2025

(54) APPARATUS AND METHOD FOR SIMULTANEOUS HYDROGEN PRODUCTION AND EMISSION CONTROL

(71) Applicant: Michael D. Barber, Loma Linda, CA (US)

(72) Inventor: Michael D. Barber, Loma Linda, CA (US)

( * ) Notice: Subject to any disclaimer, the term of this patent is extended or adjusted under 35 U.S.C. 154(b) by 0 days.

(21) Appl. No.: 18/749,459

(22) Filed: Jun. 20, 2024

Related U.S. Application Data (60) Provisional application No. 63/630,973, filed on Mar. 18, 2024.

(51) Int. Cl.
| | |
|---|---|
| *F02M 31/14* | (2006.01) |
| *B01D 53/94* | (2006.01) |
| *C01B 3/10* | (2006.01) |
| *F01N 3/02* | (2006.01) |
| *F01N 13/10* | (2010.01) |
| *F02M 31/125* | (2006.01) |

(52) U.S. Cl.
CPC ......... *F02M 31/14* (2013.01); *B01D 53/9431* (2013.01); *C01B 3/10* (2013.01); *F01N 3/0205* (2013.01); *F01N 13/10* (2013.01); *F02M 31/125* (2013.01); *B01D 2257/404* (2013.01); *B01D 2258/01* (2013.01)

(58) Field of Classification Search
CPC ........ F02M 31/14; F02M 31/125; C01B 3/10; B01D 53/9431; B01D 2257/404; B01D 2258/01; F01N 3/0205; F01N 13/10; F01P 3/00; F01P 3/02; F01P 3/12; F01P 2003/008; F01P 2003/021
See application file for complete search history.

(56) References Cited

U.S. PATENT DOCUMENTS

| | | | |
|---|---|---|---|
| 5,272,871 | A | 12/1993 | Oshima et al. |
| 5,964,089 | A | 10/1999 | Murphy |
| 6,036,827 | A | 3/2000 | Andrews et al. |
| 6,981,367 | B2 | 1/2006 | Childs et al. |
| 8,163,142 | B1 | 4/2012 | Stama |
| 8,464,667 | B1 | 6/2013 | Stama |
| 8,720,390 | B2 | 5/2014 | Lee |
| 10,011,909 | B2 | 7/2018 | Emerick |
| 10,233,809 | B2 * | 3/2019 | Henry ............... F02B 33/42 |
| 2002/0182460 | A1 | 12/2002 | Okamoto |
| 2004/0247522 | A1 | 12/2004 | Mills |
| 2008/0241614 | A1 | 10/2008 | McCanney |
| 2011/0017607 | A1 | 1/2011 | Moon et al. |
| 2011/0256052 | A1 * | 10/2011 | Merritt ............... F22G 1/165 123/3 |
| 2016/0341157 | A1 * | 11/2016 | Henry ............... F02M 26/05 |
| 2023/0053230 | A1 | 2/2023 | Jo et al. |
| 2023/0407768 | A1 * | 12/2023 | Staubach ............ B01D 53/265 |

FOREIGN PATENT DOCUMENTS

WO     WO-03104623 A1 * 12/2003 ......... B01D 53/9431

* cited by examiner

*Primary Examiner* — Grant Moubry
(74) *Attorney, Agent, or Firm* — Kirk A. Buhler; Buhler & Associates Patenting (57) ABSTRACT

Improvements in method of simultaneous hydrogen production and emission control is disclosed as a device that is configured for hydrogen generation methods for auto, truck, and stationary engine use. This apparatus and method may be applied to any single or multi cylinder, rotary engine applications including but not limited to two-stroke, four stroke or multi-cycle and gasoline, diesel, turbine, air compressor and alternative dual fuel or hybrid applications.

20 Claims, 5 Drawing Sheets

APPARATUS AND METHOD FOR SIMULTANEOUS HYDROGEN PRODUCTION AND EMISSION CONTROL

CROSS-REFERENCE TO RELATED APPLICATIONS

This application claims the benefit of Provisional Application Ser. No. 63/630,973 filed Mar. 18, 2024, the entire contents of which are hereby expressly incorporated by reference herein.

PRIOR ART

U.S. Publication Number 20110017607 was published on Jan. 27, 2011, to Joseph Michael Moon et al., and is titled On Demand Hydrogen Production Unit and Method for the on-Demand Production of Hydrogen. This publication discloses an on-demand hydrogen production unit and a method for the production of hydrogen from water by electrolysis. A container, defining a first portion for holding a plurality of parallel and plate like anodes and a second portion for holding a plurality of parallel and plate like cathodes. While this patent discloses hydrogen production it does not disclose use with a car engine.

U.S. Publication Number 20230053230 was published on Feb. 16, 2023, to Young Suk J et al., and is titled Integrate Heat Exchanger Reactors for Renewable Fuel Delivery Systems. This publication discloses an apparatus includes an integrated heat exchanger and reactor module. The integrated heat exchanger and reactor module includes a heat exchanger channel, and a reactor channel which is thermally coupled to the heat exchanger channel. The reactor channel includes a layer of catalyst material that is configured to produce hydrogen by endothermic catalytic decomposition of ammonia, which flows through the reactor channel, using thermal energy that is absorbed by the reactor channel from the heat exchanger channel. While this patent discloses hydrogen production from a heat exchanger it does not use the heat from an internal combustion engine to produce hydrogen and reduce emissions.

U.S. Pat. No. 10,011,909 issued on Jul. 3, 2018, to Patrick Emerick and is titled Method and System for Hydrogen Production and A Method of Integrating the Hydrogen Production with An Engine. This patent discloses a method comprises adding a methanol feed stream from a source methanol reservoir to a loop; wherein the loop comprises an electrolyzer, a base methanol reservoir, an electrolyzer inlet stream that directs a methanol mixture from the base methanol reservoir to the electrolyzer, and a methanol carbon dioxide stream that directs an unreacted methanol from the electrolyzer to the base methanol reservoir; and maintaining a methanol concentration in the base methanol reservoir through the opening and closing of a purge valve that allows a purge stream to flow from the base methanol reservoir to the source methanol reservoir and through the opening and closing of a feed valve that allows the methanol feed stream to flow from the source methanol reservoir into the loop. While this patent discloses hydrogen production with an engine it uses a methanol feed stream for hydrogen production.

What is needed is an apparatus and method of simultaneous hydrogen production and emission control method and system for simultaneous hydrogen production and emission control disclosed in this document provides the solution.

BACKGROUND OF THE INVENTION

Many schemes have been proposed using the "steam over hot iron reaction process" utilizing the wasted energy from an engine exhaust to perform the process. This available energy is inadequate for producing sufficient hydrogen for continuous operation or for an engine under load.

In conventional engines the cylinders are cooled by air fins on the cylinder and the cylinder head, allowing conducted heat to travel from the cylinder wall and head to the fins and dissipate to the surrounding air, thus cooling the engine. The cooling is also done by circulating a coolant around the cylinder and head. As coolant contacts the exterior of the cylinder wall, the coolant absorbs the heat as it circulates past the cylinders(s) and into a radiator. A fan blows air through the radiator and cools the circulating liquid, and then the energy or heat is released into the surrounding air.

SUMMARY OF THE INVENTION

It is an object of the apparatus and method of simultaneous hydrogen production and emission control to removing the heat from the engine's cylinders and transporting it while keeping the engine at the appropriated temperature to function, using this energy to produce hydrogen in a reaction chamber.

It is an object of the apparatus and method of simultaneous hydrogen production and emission control to produce additional steam is needed if the engine is under excessive load, the normally wasted heat generated through the catalytic reaction inside the converter. As hot exhaust gases flow through the unit, this energy in a dual-purpose catalytic converter can be utilized for the additional steam via a steam coil in or on the converter.

It is another object of the apparatus and method of simultaneous hydrogen production and emission control for the engines cylinder to be surrounded by a capture manifold. As the temperature in the cylinder rises from combustion temperature and pressure, water is injected onto the exterior wall of the cylinder. Upon striking the wall the water warms and turns to steam by absorbing the heat from the surface of the cylinder wall, thus cooling the cylinder. The steam produced is captured in the manifold surrounding the cylinder. The newly formed superheated steam leaves the manifold and travels through a conduit and into a jacket surrounding a reaction chamber. The now fully surrounded chamber by steam is ready to start. Water is then sprayed onto the exterior wall of the reaction chamber, thereby causing the steam encased in a jacket to condense on the wall surface of the chamber. This causes the steam condensing on the wall to give up its latent energy, raising the temperature of the wall. Through thermal conductivity, it transfers the heat into the interior of the reaction chamber. The now heated interior wall surfaces rises. When the interior to the reaction chamber reaches sufficient temperature, additional steam is now injected into the inside of the chambers, striking the chamber walls. If the wall is made of iron or another substance that may be oxidized, the now heated iron reacts with steam and the steam over hot iron process begins by oxidation of the iron. The resulting product is hydrogen gas and unreacted steam which may be used as fuel to run the engine.

It is another object of the apparatus and method of simultaneous hydrogen production and emission control to use steam over hot iron to produce hydrogen is a reversible process. In the operation described above, steam is passed over hot iron liberating Hydrogen gas. The hydrogen produced is swept away by the stream of H20 steam into the intake of the engine. To reverse the reaction, the material, which was reduced to iron oxide produced earlier, is reduced back to iron by causing a stream of hydrogen and steam to pass over it. The process in this invention is reversible without a chemical agent other than the original steam initially used to oxidize the material. The material deposited on the inner surface of the reaction chamber could be iron, a coating or alloy of iron, solid or powder, pellets or any oxide or material than can be oxidized with steam or gas.

It is another object of the apparatus and method of simultaneous hydrogen production and emission control to utilizing the catalytic converter properties of converting hazardous waste engine gases into less hazardous products while simultaneously aiding in the production of hydrogen fuel at the same time. This is a necessary accessory to the engine for reducing exhaust emissions. By also utilizing this wasted heat from the engine entering the converter, we raise the overall efficiency of the engine even further. The temperature at which the catalytic converter begins to work is around 600 degrees F. with a normal range of around 1,400 degrees F. Some combustion occurs in gasoline-powered automobiles inside the catalytic converter, but this combustion does not provide power to the automobile and therefore is not "useful." This invention will utilize this wasted energy to produce steam to be used in hydrogen production along with the wasted energy in the cooling of the engine to produce Hydrogen for fuel, as well as reduce harmful emissions simultaneously. The exhaust from a hydrogen fueled engine is primarily water vapor and some oxides of nitrogen from combustion. The oxides can be reduced by the catalytic converter part of the invention. This novel dual approach for producing hydrogen may also be used for reforming processes to produce other types of fuels as well.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

ITEM NUMBERS AND DESCRIPTION 112 water tank
114 water tank & regulator
116 conductor
118 actuator rod
120 conductor
122 conduit
124 exhaust gas to water heat exchanger
128 inert gas supply tank
130 steam conduit & diverter valve
132 steam regulator & diverter valve
134 inert gas regulator
136 condenser water diverter valve
138 port
140 fuel regulator for hydrogen and steam mixture
142 engine air inlet
144 cylinder heater
146 exhaust manifold port
150 condensate tank
152 nitrogen injector valve
154 water injector jet
156 steam conduit
162 engine exhaust conduit
158 reaction chamber
164 water flow regulator
166 hot water conduit
168 hot liquid condensate conduit
170 piston
172 connecting rod
174 crankshaft
176 engine cylinder heater wire
178 electric heating coil leads
180 engine valves
182 water conduit from water supply
184 steam conduit from reaction chamber
186 steam coil
188 catalytic converter
190 steam capture manifold
192 steam jacket interior
194 hot condensates return conduit
196 exhaust exit from catalytic converter 198 cylinder head
200 reaction chamber A
202 reaction chamber B
204 water jet nozzle
206 cylinder exterior wall
208 port
210 port
212 cleaning brush
214 brush shaft to actuator
216 actuator
218 actuator support
220 support mount fastener
222 vacuum inlet
224 vacuum line
226 vacuum source
228 actuator motor
230 steam nozzle
232 valve for brush to enter
234 exhaust inlet
236 steam generator coil
238 Steam generator housing
240 water inlet to steam generator
242 water exit from steam generator
246 pollution catalyst inside catalytic converter
248 catalytic converter housing
250 steam condenser
254 inert gas port
258 conduit.

Figure 1:
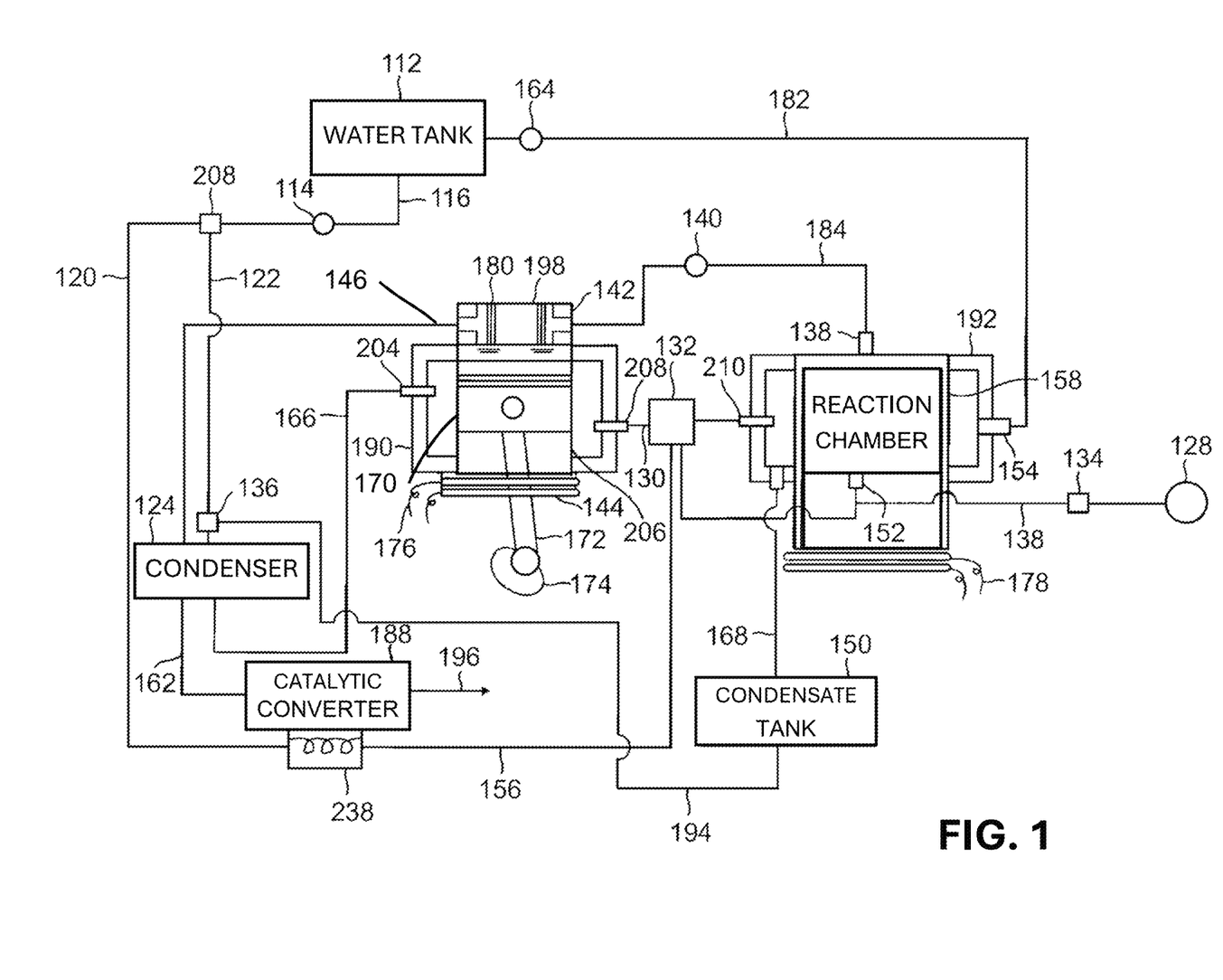
FIG. 1 is a component layout of the apparatus and method of simultaneous hydrogen production and emission control.

FIG. 1 shows the preferred layout of the apparatus and method of simultaneous hydrogen production and emission control. Water from tank 112 flows through conduit 116 and through regulator 114 into diverter valve 208 through conduit 122 through diverter valve 136, then into exhaust gas heat exchanger 124. Exhaust from the exhaust manifold port 146 goes into the condenser 124. The heated water flows through conduit 166 into water jet nozzle 204. The water leaves the nozzle and hits the exterior of cylinder wall 206. Within cylinder wall 206 is piston 170, connected to connecting rod 172 that turns crankshaft 174. The exterior wall is now heated from engine operation or pre heated from a heating coil 144 wrapped around the cylinder. The heating coil could be of induction type or standard resistance heat coil and powered by an auxiliary battery for this purpose. The water now striking the hot exterior of the cylinder heats and turns to steam and is surrounded by a capture manifold 190. When sufficient cooling of the cylinder is achieved the steam leaves the manifold through port 208 and conduit 130 and passes through steam diverter valve 132.

The heated steam flows into the interior of reaction chamber jacket 192. As steam enters the jacket, it surrounds the reaction chamber 158. Once fully surrounded by water from water tank 112, it flows through regulator 164 and through conduit 182. The heated steam flows out through water injector nozzle 154, where it strikes the exterior surface of reaction chamber 158. Heating of the reaction chamber 158 can also be from electricity through electric heating coil leads 178. The surrounding steam now condenses on the surface of the chamber where it gives up its latent head and energy, thereby raising the surface temperature of the exterior wall through thermal conductivity, the inner surface rises, as the reaction chamber is a hollow chamber. When the surface of the interior of the reaction chamber reaches a sufficient temperature, steam is injected inside the chamber through nitrogen injector valve nozzle 152 where it strikes the interior wall surface. If the surface walls inside the chamber are made of iron or any substance that may be oxidized, heated iron reacts with the steam and the steam over hot iron process begins to oxidize the reduced iron.

With steam, the resulting product of gas hydrogen and unreacted steam flows into the intake of the engine and is used as fuel. If necessary, nitrogen or another inert gas stored in tank 128 can be delivered through conduit 254 through regulator 134 into nozzle 152. Then nitrogen or another inert gas goes into the reaction chamber and out through port 138, where it is combined with the produced hydrogen gas and steam and moves out of the chamber via conduit 184. It then goes into regulator 140 and into intake port 142 of the engine to be used as fuel.

The condensate produced from the condensation of the steam around the reaction chamber is also recycled as it leaves the steam jacket around the reaction chamber 158, through conduit 168 and into condensate tank 150. The condensate leaves the tank through conduit 194 and into liquid heat exchanger 124 to be used again.

The engine is being cooled by the evaporation of water sprayed on the exterior of the cylinder. Therefore, no cooling jacket is required around the cylinder(s), cooling may only be required in the cylinder head (if needed).

The temperatures of combustion in the engine, emissions from a hydrogen fueled engine, though mostly water vapor, may contain some traces of oxides of Nitrogen found in the exhaust. The apparatus and method use a dual-purpose catalytic converter to eliminate this harmful emission to provide an exhaust of pure water vapor, while further capturing the normally wasted energy in the engine and using it for greater efficiency. In prior art gas engines exhaust went through the exhaust gas heat exchanger 124 and leaves through conduit 162 and enters the catalytic converter 188, the exhaust gases react with the catalyst. It converts harmful oxides of nitrogen into traces of harmless nitrogen, exiting along with water vapor through exhaust pipe 196. Inside or on the surface of the converter's housing (which is hot from the temperature of the exhaust and the catalytic reaction) is a steam coil 186 with water from water tank 112 though conduit 120. As the water inside the coil heats and turns to steam, the steam exits through conduit 156 past regulator and diverter valve 132. The water then flows through steam nozzle 210, where it provides additional steam upon demand for hydrogen production.

Steaming over hot iron to produce hydrogen is a reversible process. In the operation described above, steam is passed over hot iron, liberating Hydrogen gas. The hydrogen produced is swept away by the stream of H20 into the intake of the engine. To reverse the reaction, the material, which was reduced to iron oxide produced earlier, is reduced back to iron when steam is swept with the stream of hydrogen and passing over it. The process in this invention is reversible without a chemical agent other than the original steam initially used to oxidize the material. The material deposited on the inner surface of the reaction chamber could be iron an alloy of iron, solid or powder, pellets or any oxide or material that can be oxidized with the steam or gaseous compound or element.

Figure 2:
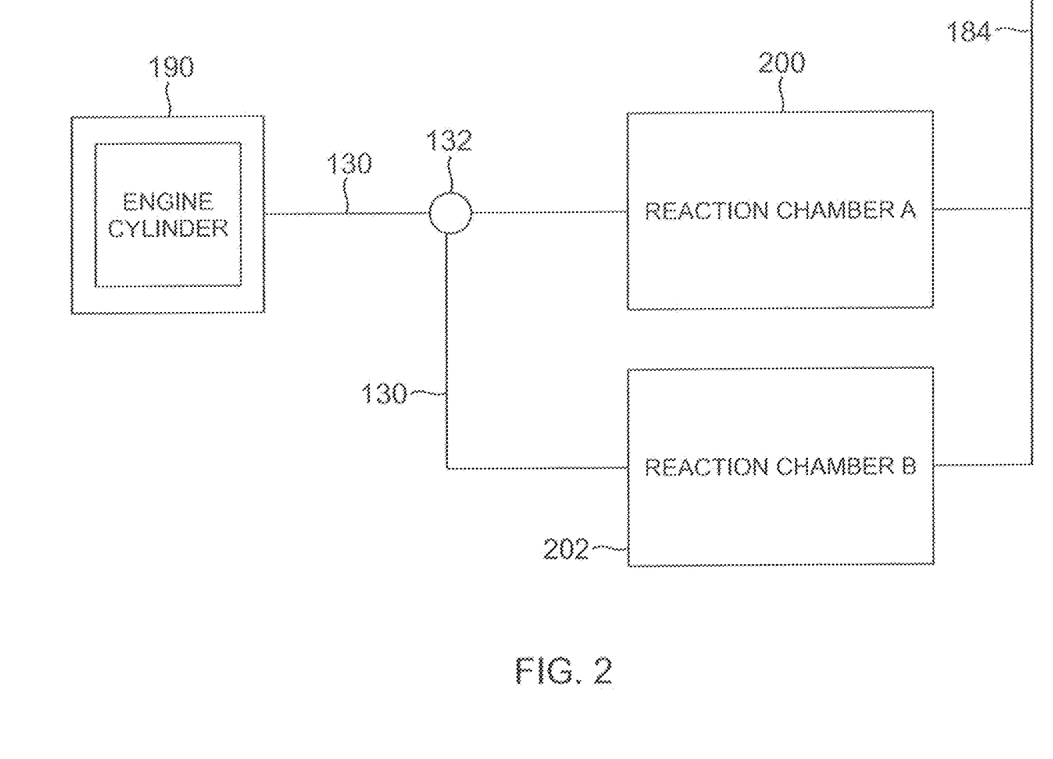
FIG. 2 shows the component layout for rejuvenation of multiple reaction chambers.

FIG. 2 shows the component layout for the rejuvenation of the reaction chamber(s) and is described as steam leaving manifold 190 at it flows through conduit 130 and into diverter valve 132 and is first diverted to reaction chamber A 200. After operating for a time and the rate of hydrogen production falls to a predetermined level, prompted by sensors or a control computer, the systems regenerate mode starts. Some of the steam from diverter valve 132 is diverted to reaction chamber B 202 for hydrogen production. While in reaction, chamber A 200 hydrogen and steam and/or an inert gas is passed by the inner surface of the chamber and the surface walls.

A reduction process then occurs, reducing the iron or its alloy back to its original state and ready to start the cycle again. This time steam is produced and swept away by the stream of hydrogen and nitrogen produced from reaction chamber A 200 from conduit 184. The newly formed steam and hydrogen are introduced into the intake port of the engine as fuel. Reaction chamber A 200 and chamber B 202 alternate. While one is producing hydrogen, the other chamber is rejuvenating its interior, and the cycle repeats.

Figure 3:
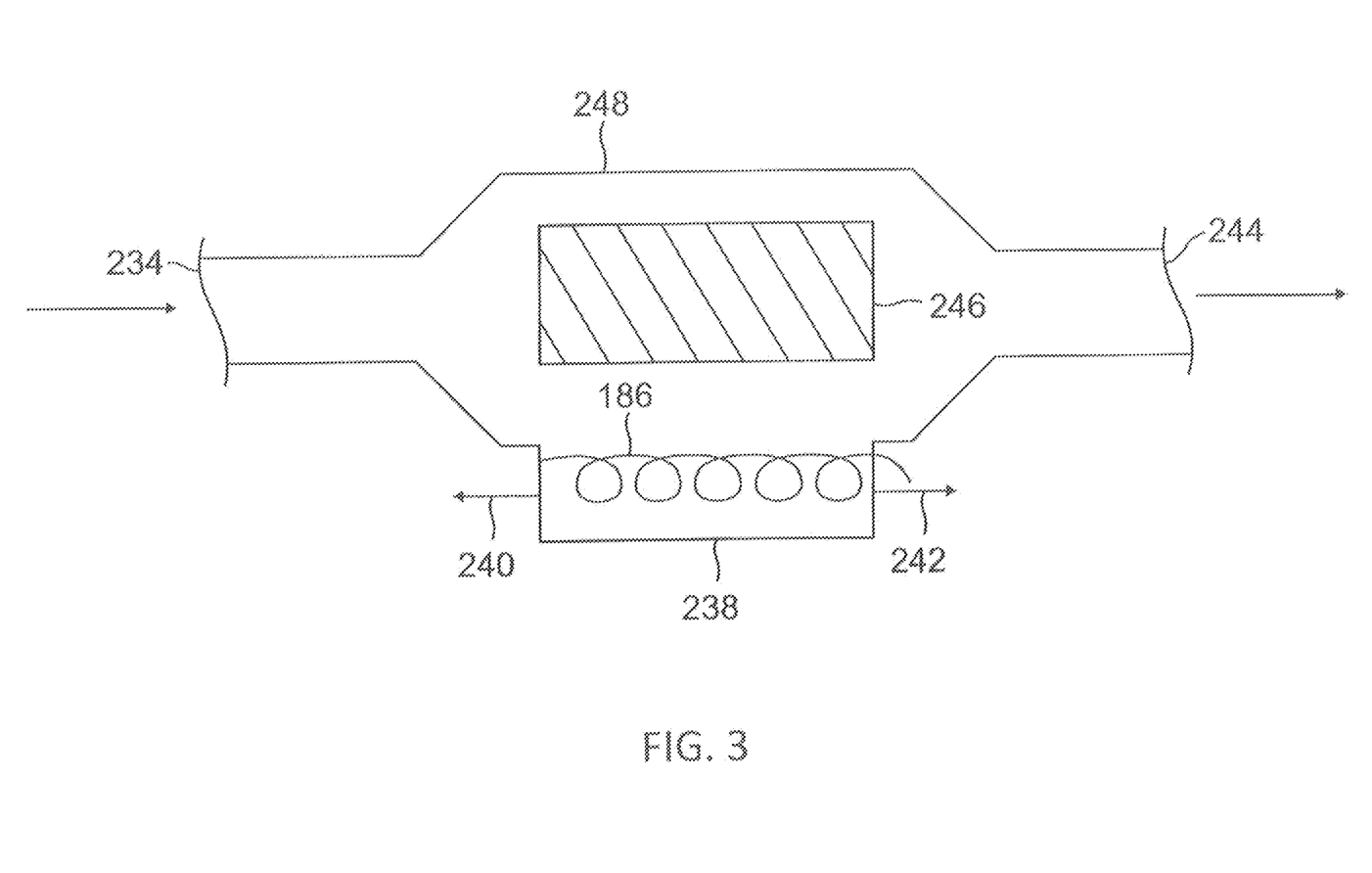
FIG. 3 shows the diagram of a dual-purpose catalytic converter.

FIG. 3 shows the dual-purpose catalytic converter and operates as exhaust exits heat exchanger 124 though conduit 162 enters the catalytic converter housing 248 though its inlet 234. The hot exhaust flows past the converters catalyst 246 and starts an exothermic catalytic reaction. As oxides of nitrogen are reduced, this reaction results in heat inside causing the temperature to rise inside and to the outer housing of the converter. A steam coil 186 or a pipe chamber is placed inside the steam generator housing 238. Then water in tank 112 flows through conduit 120 and enters through inlet 240. The water inside starts to boil and turns to steam as it absorbs some of the heat. Due to the catalytic reaction of the converter's catalyst, the water now turned to steam that exits through opening 242 and conduit 186. The steam can now be used in the process of producing hydrogen in the system. The engine's exhaust exits through the rear of the converter through catalytic converter exhaust 196.

Figure 4:
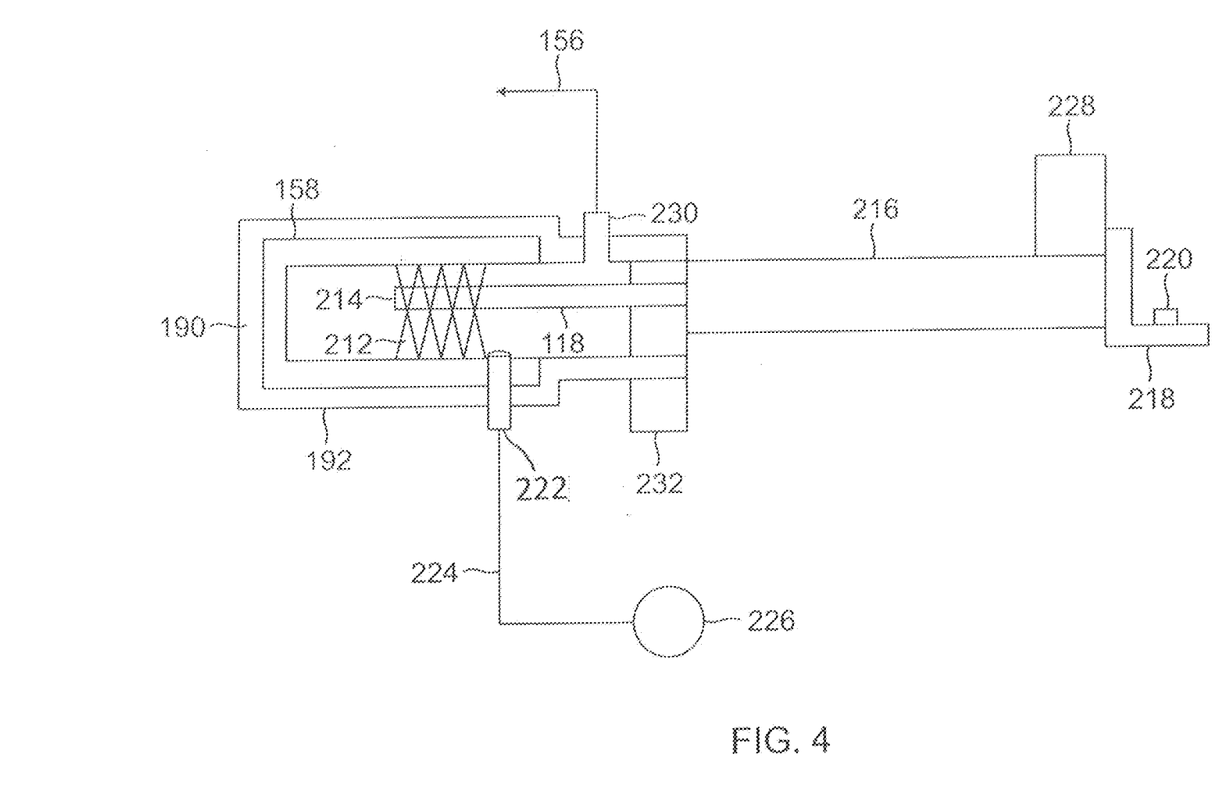
FIG. 4 shows the diagram of a mechanism for cleaning a reaction chamber.

FIG. 4 shows a method of cleaning the interior of the reaction chamber(s) which can be used by itself or in conjunction with alternate style reactions chambers system and is described as actuator 216 on actuator motor 228 through actuator support 218 with a support mount fastener 220 that has a rod 118 with a stroke long enough to extend into reaction chamber 158 with an abrasive brush or expansive hardware with a brush. When activated, the actuator extends and spins the abrasive brush 212 on shaft 214 from one end and retracts while spinning though opened valve 232. The debris created during the cleaning process is evacuated out through vacuum inlet 222, through vacuum line conduit 224 which is connected to a vacuum source 226. When the cleaning of the chamber is completed and the actuator is fully retracted, valve 232 closes and normal operation of the reaction chamber can continue. At the top of reaction chamber 158 is a steam nozzle that feeds into the steam conduit 156.

The process(es) described above can be controlled through sensors and computer sequencing for automatic operation and would be performed periodically as needed. The reconditioning of the reaction chamber(s) would extend the surface or coatings time before it would have to be replaced.

Figure 5:
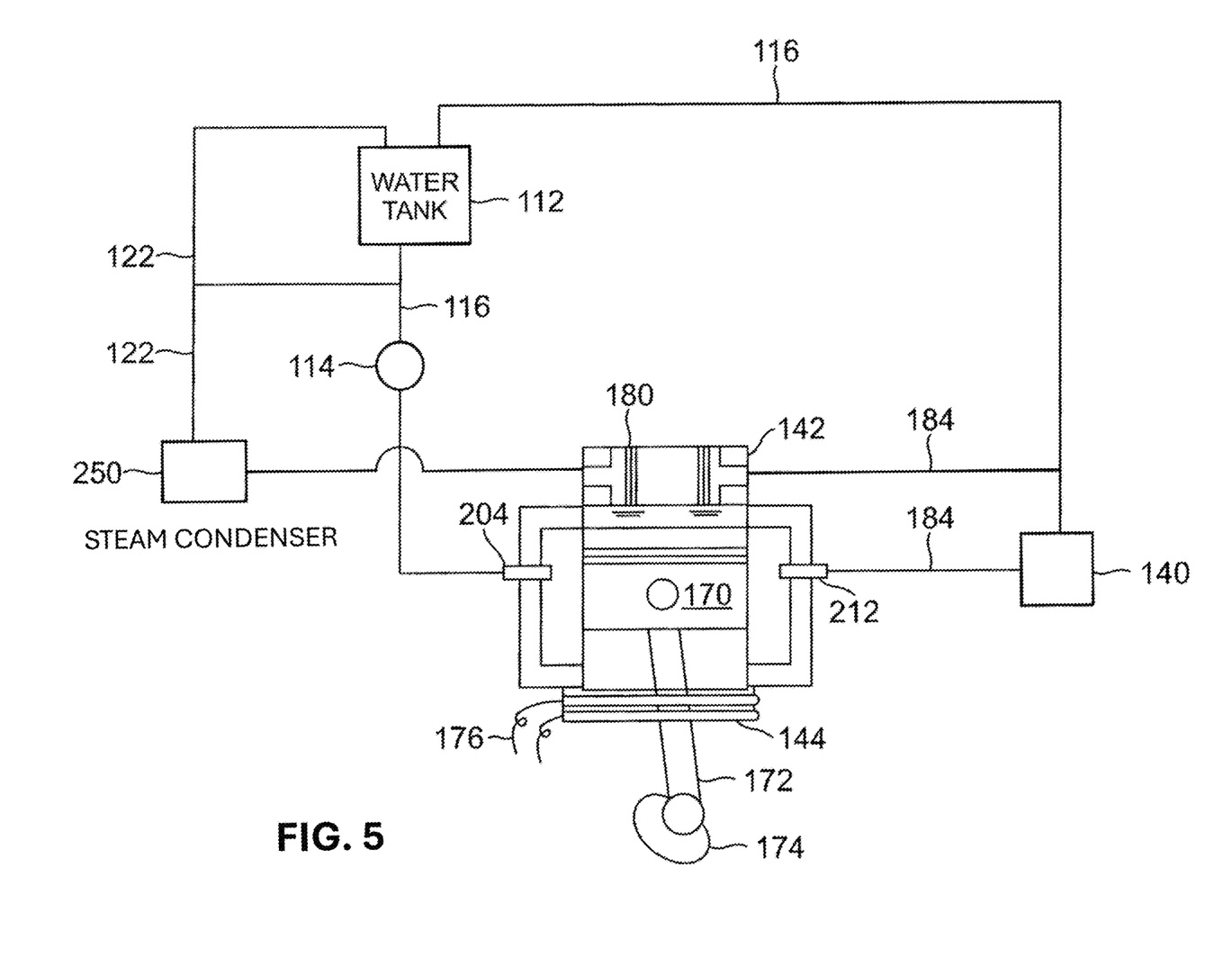
FIG. 5 shows an alternate version of the invention using the engine cylinder exterior for a reaction chamber.

FIG. 5 shows another preferred embodiment of the apparatus and method using the exterior of the engine cylinder to act as a reaction chamber. Water leaves tank 112 through conduit 116 and past regulator 114 and into water jet 204 that is mounted in a capture manifold 190 surrounding the cylinder wall. The water flowing hits the hot exterior of the cylinder wall that is heated by combustion occurring inside the cylinder. The water striking the exterior of the cylinder now heats up and turns to steam, as the water absorbs the heat on the surface of the cylinder wall. This lowers the temperature of the cylinder, thereby allowing the engine to function at a normal operation temperature while oxidizing the surface of the wall which may be iron, a coating or any alloy which may be oxidized by H20 steam.

The oxidized surfaces byproducts are Hydrogen and any unreacted steam which may be used as fuel for the engine. The byproducts leave the capture manifold 190 though port 210 into conduit 184, flowing through regulator 140 and into engine air intake 142 via conduit 184 in the head of the cylinder 206 through engine valve(s) 180 in the cylinder head 198. The newly created hydrogen and the unreacted steam may be assisted in transport by an inert gas provided from tank 128 through conduit 258 past regulator 140 and injected through port 243.

The rejuvenation of the exterior of the cylinder wall acts as a reaction chamber with the enclosed jacket that can be reduced back to its original state by flowing Hydrogen and H20 steam across the surface. Thus, having it available once again for hydrogen production, as the steam over hot iron is a reversible process. This may also be done with a multiple cylinder engine by alternating cylinders. This is done by one cylinder being used for hydrogen production during a period, while the other cylinder is being rejuvenated and alternating the cycle between cylinders.

Various features of the apparatus for producing hydrogen for use as fuel production include eliminating carbon related emissions in internal combustion engines or machinery. Substantially reducing or eliminating such emissions including carbon dioxide. The method and system can be easily adapted for IC mobile or stationary engines uses. The system and method eliminate the need for Hydrogen filling stations and infrastructures.

Thus, specific embodiments of an apparatus and method of simultaneous hydrogen production and emission control have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An apparatus for simultaneous hydrogen production and emission control comprising:
 an internal combustion engine where exhaust gases flow from an exhaust manifold port into an exhaust gas heat exchanger;
 a water tank that supplies water through a regulator into said exhaust gas heat exchanger to create heated water;
 said heated water flows through a conduit into a water jet nozzle;
 water from said water jet nozzle contacts an exterior of a cylinder wall of said internal combustion engine and turns into steam and is contained within a manifold;
 said steam passes through a port and into a steam diverter valve and into an interior of a reaction chamber jacket where said steam surrounds a reaction chamber;
 said steam then flows through a second regulator and back into said water tank, and
 a resulting product of gas hydrogen and unreacted steam flows into an intake of said engine and is used as fuel.

2. The apparatus according to claim 1, wherein said internal combustion engine has a piston connected to a connecting rod that turns a crankshaft.

3. The apparatus according to claim 1, wherein said exterior of the cylinder wall is pre heated with a heating coil.

4. The apparatus according to claim 3, wherein said heating coil is wrapped around said cylinder wall.

5. The apparatus according to claim 3, wherein said heating coil is inductive or resistive.

6. The apparatus according to claim 3, wherein said heating coil is powered by a battery.

7. The apparatus according to claim 1, wherein surface walls of said reaction chamber are made of iron or a material that oxidizes.

8. The apparatus according to claim 7, wherein said iron or said material that oxidizes heats and reacts from said steam and oxidizes said iron or said material that oxidizes.

9. The apparatus according to claim 7, wherein said reaction chamber is pre heated with a reaction chamber heating coil.

10. The apparatus according to claim 7, wherein said product of gas hydrogen is reversible without a chemical agent other than said steam that is initially used to oxidize said iron or said material that oxidizes.

11. The apparatus according to claim 9, wherein said reaction chamber heating coil is inductive or resistive.

12. The apparatus according to claim 9, wherein said reaction chamber heating coil is powered by a battery.

13. The apparatus according to claim 1, wherein nitrogen or other inert gas is stored in a second tank and is delivered though a second regulator and into said reaction chamber.

14. The apparatus according to claim 13, wherein said nitrogen or other inert gas is combined with said steam in said reaction chamber and moves into said intake of said engine and is used as fuel.

15. The apparatus according to claim 1, wherein a condensate produced from condensation of said steam around said reaction chamber is recycled as said condensate leaves said reaction chamber jacket and goes into a condensate tank.

16. The apparatus according to claim 15, wherein said condensation from said condensation tank goes into said internal combustion engine and is used as fuel.

17. The apparatus according to claim 1, further includes a dual-purpose catalytic converter.

18. The apparatus according to claim 17, wherein said dual-purpose catalytic converter heats water into steam that is used to produce hydrogen.

19. The apparatus according to claim 1, further includes two reaction chambers.

20. The apparatus according to claim 19, wherein said two reaction chambers operate as alternating reaction chamber and rejuvenation chamber such that a first chamber is used for hydrogen production while a second chamber is used as a rejuvenation chamber.

* * * * *